United States Patent [19]
Morrison

[11] Patent Number: 5,760,816
[45] Date of Patent: Jun. 2, 1998

[54] VARIABLE PHASE CLOCK GENERATOR FOR AN ELECTROPHOTOGRAPHIC PRINTER

[75] Inventor: Robert D. Morrison, Star, Id.

[73] Assignee: Hewlett-Packard Company, Palo Alto, Calif.

[21] Appl. No.: 596,032

[22] Filed: Feb. 6, 1996

[51] Int. Cl.[6] .................................................... B41J 2/47
[52] U.S. Cl. ............................................ 347/247; 347/237
[58] Field of Search .................................. 347/247, 237, 347/249

[56] References Cited

U.S. PATENT DOCUMENTS 5,331,342  7/1994  Shimatani et al. .................... 342/249
5,438,353  8/1995  Morrison .

*Primary Examiner*—Mark J. Reinhart

[57] ABSTRACT

An electrophotographic printer includes a photoreceptor on a drum or belt, a laser beam that is reciprocally scanned thereacross, a beam detect signal circuit for generating a beam detect signal and an asynchronous clock oscillator for generating clock pulses. The printer also includes circuitry for generating a plurality of clock signals that are phase synchronized with the beam detect signal. The circuitry includes a tapped delay line for receiving the asynchronous clock pulses, each tap outputting a delayed clock pulse train. A register/selector circuit is coupled to the taps and is responsive to a transition of the beam detect signal for determining a tap which outputs a 0° phase clock transition that is closely proximate to the beam detect signal. Phase delay logic provides signals indicative of which taps of the delay line circuit manifest clock pulse trains that are closest in time to leading and lagging edges of a 0° phase clock pulse, respectively. The phase delay logic circuit further determines taps of the delay line circuit that are intermediate the aforesaid taps and which of those taps should be utilized to provide delayed clock signals of a fractional phase. Signals from the selected taps are thereafter switched to output circuits.

8 Claims, 6 Drawing Sheets

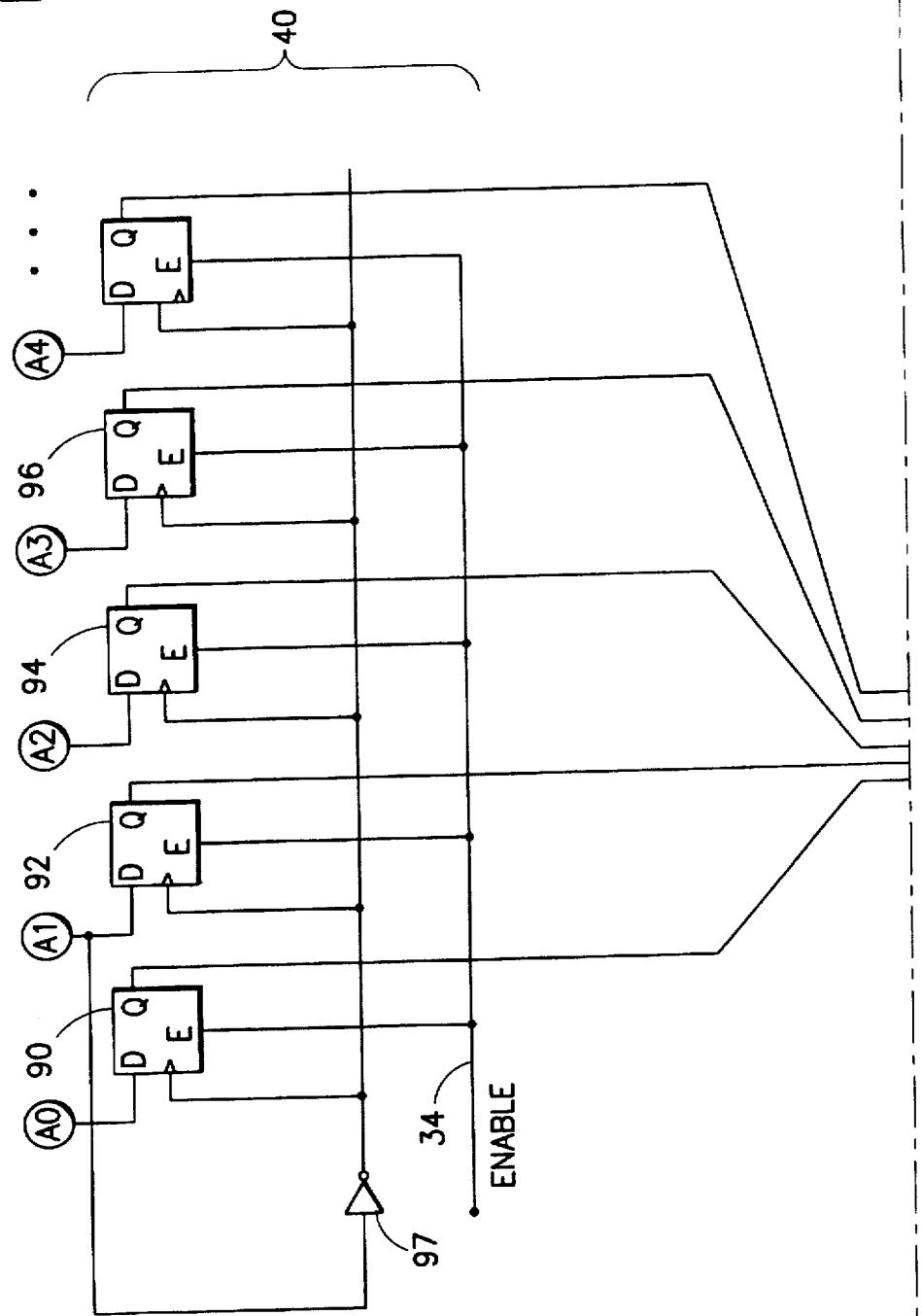

VARIABLE PHASE CLOCK GENERATOR FOR AN ELECTROPHOTOGRAPHIC PRINTER

FIELD OF THE INVENTION

This invention relates to a system for generating clock signals in an electrophotographic printer and, more particularly, to a clock signal generator capable of generating clock signals having a variable phase relationship to a beam detect pulse.

BACKGROUND OF THE INVENTION

Laser printers operate by scanning a laser beam across a photosensitive, electrically charged, photoreceptor surface. If the laser beam is modulated, resulting variations in charge are translated to proportionate amounts of toner deposited on a sheet of paper in the printer. The laser scans the photoreceptor surface from left to right, generating a signal at the beginning of each scan line that is used to initiate modulation of the laser for that scan line. The latter signal is called the beam detect signal, and is asynchronous to the input clock reference oscillator. The clock reference oscillator determines the width of each printed pixel. Since the clock reference oscillator output is asynchronous to the beam detect signal, the clock reference oscillator cannot be used to directly clock pixel data without causing phase errors in the video output.

Circuits shown in U.S. Pat. No. 5,438,353, to the inventor hereof, address this problem by generating a clock signal for each scan line which is precisely synchronized with the beam detect signal. The '353 patent discloses a clock signal generator which utilizes both a beam detect signal from a laser beam detector and an asynchronous clock signal from the output of a clock generator. A clock phase modulator operates to delay the output signal from the asynchronous clock generator and then selects the delayed clock signal which is closest in phase to the phase of the beam detect signal. The disclosure of U.S. Pat. No. 5,438,353 is incorporated herein by reference.

The use of such a clock selection system provides a major increase in pixel alignment accuracy in a laser printer. However, as laser printer speeds continue to increase, a requirement for clock signals having a variable phase relationship to the beam detect signal has arisen.

With increased printer speeds, pixels and pixel components are now required to be generated having various phase relationships to the video reference clock signal. It is no longer sufficient to just use a 0° phase clock signal. A capability to generate reference clocks having plural desired phases relative to the beam detect pulse is now needed.

Phase locked loops can be used to generate signals with variable phases and, such phase locked loops have been designed using delay element chains similar to that described in the '353 patent referenced above. However, phase locked loops require a continuous (or discretely sampled) error signal which is not available from a laser printer scanner. Such an error signal continuously adjusts the phase locked loop output frequency to track a reference frequency. In a laser printer, only one signal edge is available which indicates the required phase relationship, and that is the beam detect signal. Thus, phase locked loops are not a viable solution to obtaining multiple phase clock signals for the operation of a laser printer.

Accordingly, it is an object of this invention to provide an improved circuit for generating variable phase clock signals for a laser printer.

It is another object of this invention to provide a variable phase clock generator which is precisely referenced to a beam detect signal in a laser printer.

It is a further object of this invention to provide a variable phase clock generator wherein each clock phase generated bears a precise relationship to a beam detect signal, and the phase of each clock signal is adjustable across a plurality of possible phase relationships.

SUMMARY OF THE INVENTION

An electrophotographic printer includes a photoreceptor on a drum or belt, a laser beam that is reciprocally scanned thereacross, a beam detect signal circuit for generating a beam detect signal and an asynchronous clock oscillator for generating clock pulses. The printer also includes circuitry for generating a plurality of clock signals that are phase synchronized with the beam detect signal. The circuitry includes a tapped delay line for receiving the asynchronous clock pulses, each tap outputting a delayed clock pulse train. A register/selector circuit is coupled to the taps and is responsive to a transition of the beam detect signal for determining a tap which outputs a 0° phase clock transition that is closely proximate to the beam detect signal. Phase delay logic provides signals indicative of which taps of the delay line circuit manifest clock pulse trains that are closest in time to leading and lagging edges of a 0° phase clock pulse, respectively. The phase delay logic circuit further determines taps of the delay line circuit that are intermediate the aforesaid taps and which of those taps should be utilized to provide delayed clock signals of a fractional phase. Signals from the selected taps are thereafter switched to output circuits.

DETAILED DESCRIPTION OF THE INVENTION

The variable phase clock generator incorporating the invention hereof will first be described at a general level by indicating the functions of subsections of the clock generator. The general description will then be followed by a detailed consideration of an example to illustrate the specific operation of the invention.

Figure 1:
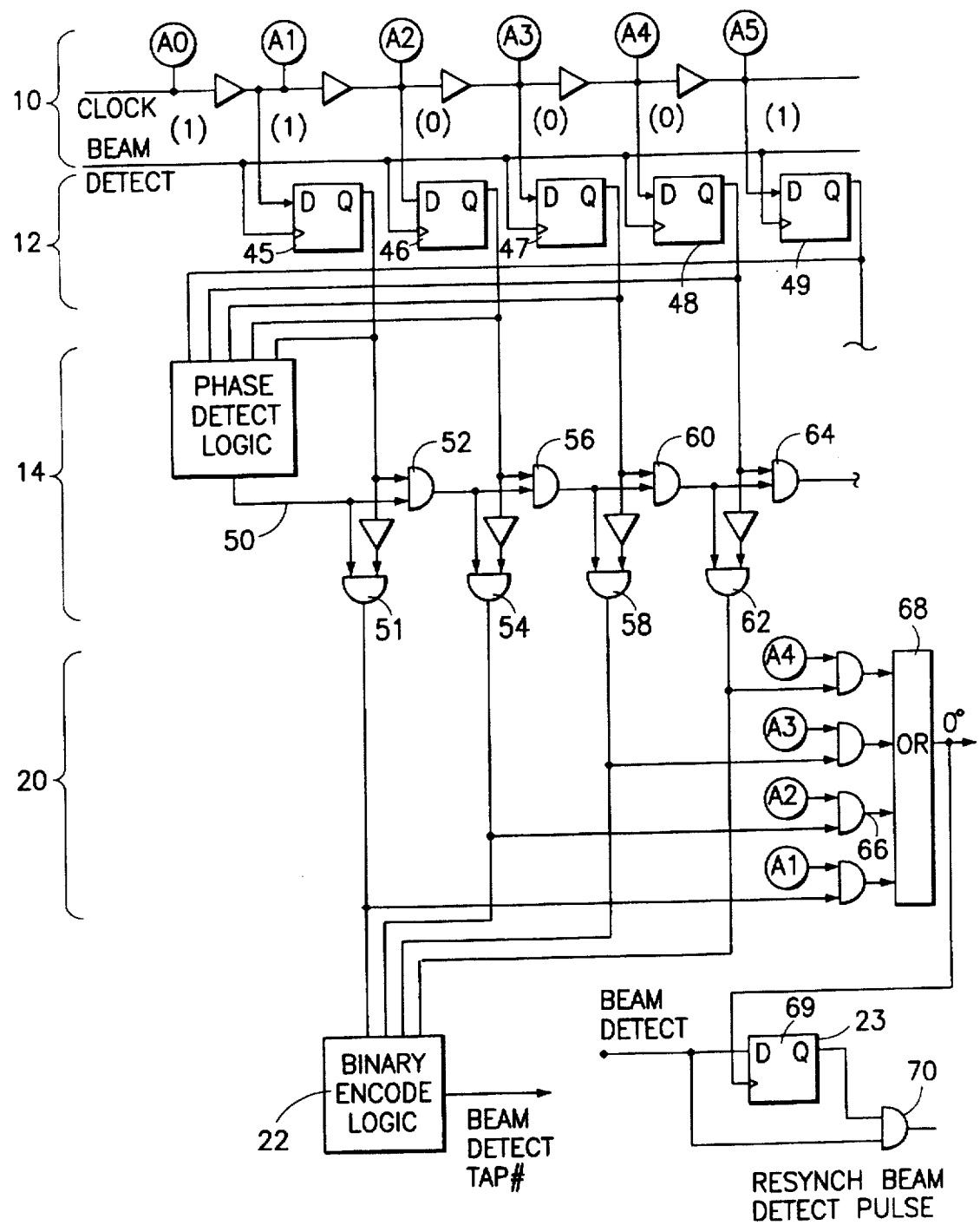
FIG. 1 is a block diagram of a 0° phase determination circuit which is similar, in some respects, to that shown in U.S. Pat. No. 5,438,353.

Referring to FIG. 1, the modules shown therein determine which tap, of a plurality of taps of delay chain 10, provides a clock signal transition that is most closely positioned in time to a beam detect signal (i.e., a 0° phase tap). Delay chain 10 is comprised of a plurality of non-inverting buffers and the clock signal outputs at terminals A0–An are plotted in FIG. 5. The input to delay chain 10 is an asynchronous crystal clock signal (which signal is available on tap A0).

Figure 5:
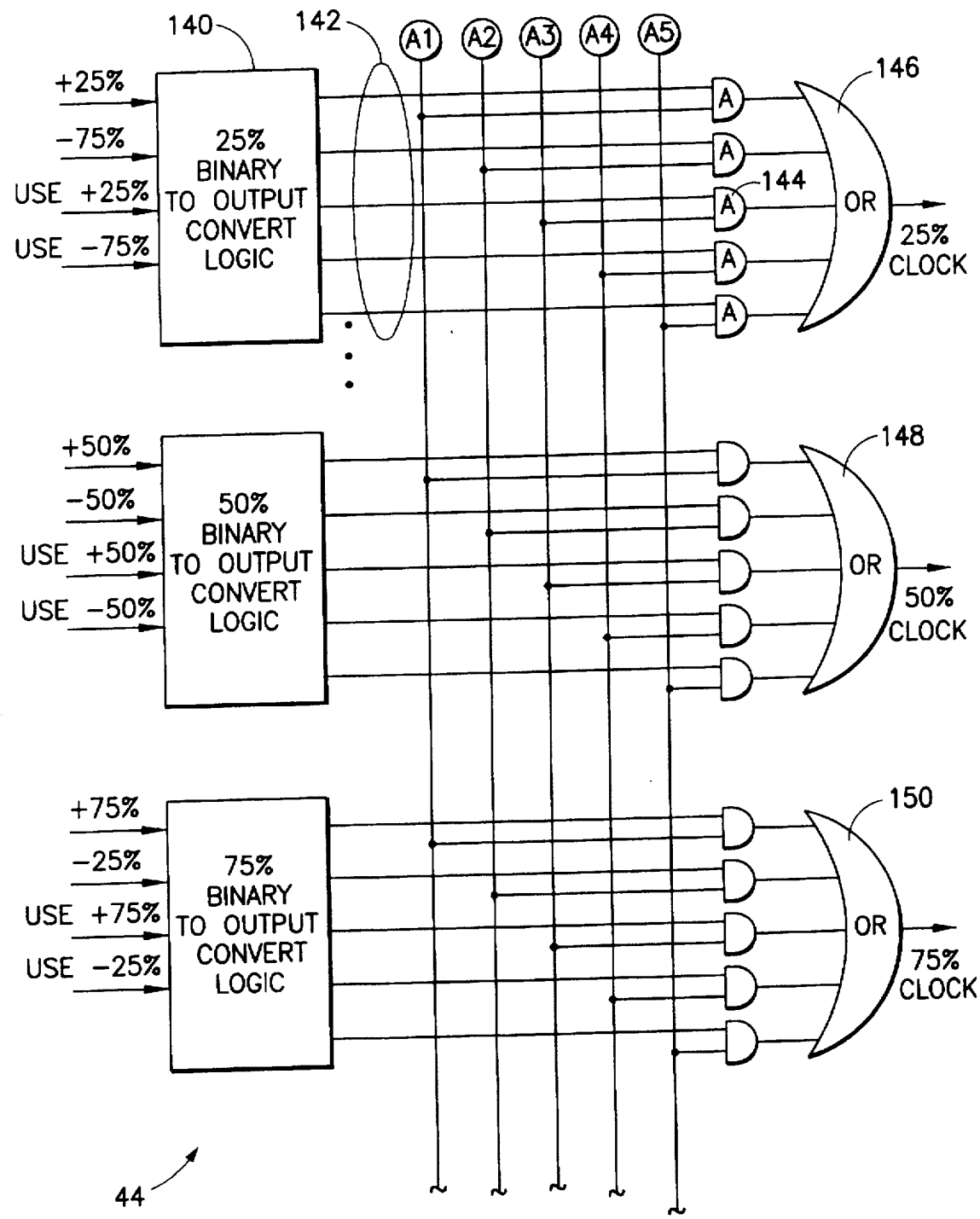
FIG. 5 is a block diagram of phase gate logic which outputs phase synchronized clock signals in accordance with control inputs from the phase control logic of FIG. 4.

A "snapshot" register 12 comprises a plurality of flip-flops and is clocked by the beam detect signal to register the output levels appearing at terminals A0–An at the transition time of the beam detect signal (see again FIG. 5 at time T1). Each of the flip-flops in snapshot register 12 thereby indicates at its output, the level at each of taps A0–A5 at the time of occurrence of the beam detect transition.

A search logic circuit 14 includes a phase detect logic circuit 16 which determines if a metastable state exists and, if not, provides an output equal to the high or low state output of the first flip-flop in snapshot register chain 10. Briefly stated, the outputs from the flip-flops in snapshot register chain 12 should exhibit a plurality of "0" levels followed by a plurality of "1" levels (or vice-versa), indicating a series of delay elements outputting the high state of the clock signal followed by a series of delay elements outputting the low state of the clock signal. If, however, the outputs appearing from the first three flip-flops in snapshot register 12 indicate 101 or 010 states, it is known that a metastable state has occurred and that the output of the first flip-flop cannot be relied upon. In such case, phase detect logic 16 examines the second and following flip-flops to determine if a further metastable state exists, etc., etc. As aforesaid, under normal circumstances—assuming no metastable states, phase detect logic 16 indicates at its output the level appearing at the first flip-flop in snapshot register 12.

Search logic 14 examines each of the outputs of the flip-flops in snapshot register chain 10 and, in combination with the output of phase detect logic 16, determines which flip-flop output manifests a level transition (i.e., a high level following a series of low levels or vice-versa). That determination is made by using a carry select propagation scheme which disables all AND gates of search logic 14 prior to the level transition and all AND gates subsequent to the transition. As a result, only one of the AND gates in search logic 14 provides a gating output to one of a plurality of AND gates in selector logic 20. Thus, one of the AND gates in selector logic 20 is gated to enable passage therethrough of a delayed clock signal appearing at one of terminals A1–An as the 0° phase output clock. In addition, a binary encode logic module 22 determines the tap number in delay chain 10 which outputs the 0° phase clock.

As there may be a time offset between the beam detect signal and the 0° phase clock transition, the output of selector logic 20 is fed to a resynchronizing circuit 23 which provides a phase adjusted beam detect pulse that is resynchronized to the 0° phase clock. That signal is used to commence various printer actions in synchronism with the 0° phase clock.

Once the 0° phase clock and a delay chain tap number which manifests the 0° phase clock have been determined, further circuitry is employed to generate binary values of the tap positions which manifest additional desired phase clocks (e.g. 25%, 50% and 75% phase-displaced clocks from the 0° phase clock).

Figure 2:
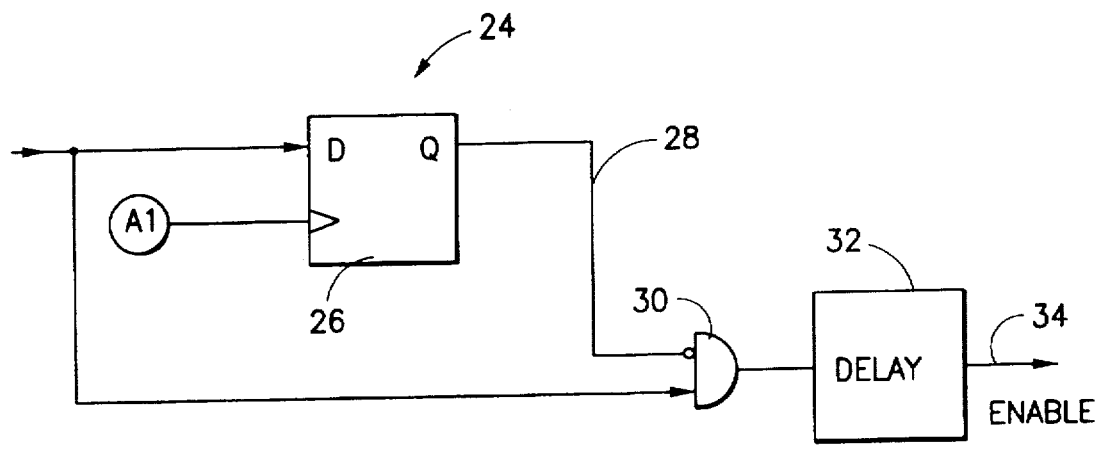
FIG. 2 is a block diagram of a pulse enable logic circuit that limits clock resynchronization to once per beam detect signal.
Figure 3:
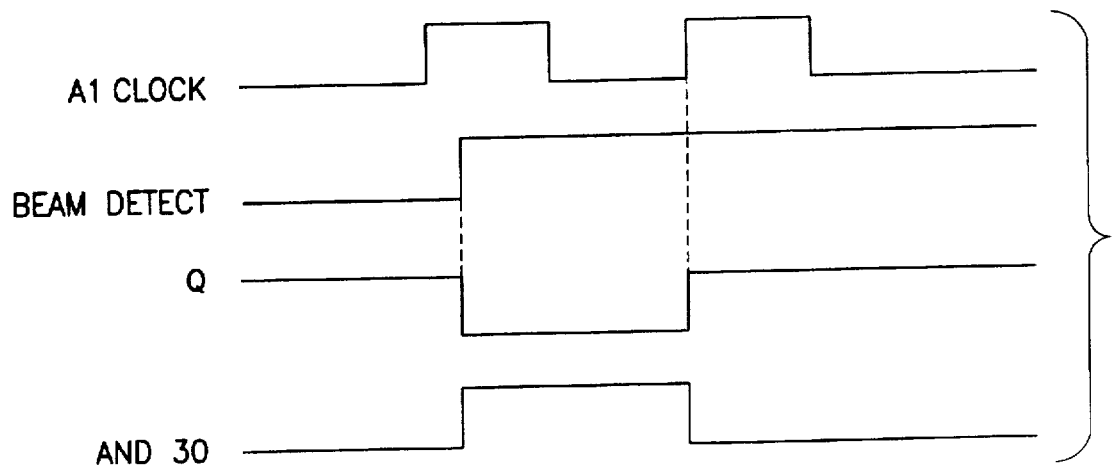
FIG. 3 is a waveform diagram helpful in understanding the operation of the circuit of FIG. 2.

In FIG. 2, an enable circuit 24 functions to provide an enable signal on output enable line 26 only between a transition of a delayed clock pulse from tap A1 and the beam detect signal transition. More specifically, as shown by the waveforms of FIG. 3, when the A1 clock first transitions to the high state, the Q terminal of flip flop 26 provides a low output on line 28 (as the beam detect signal is still low). Thereafter AND gate 30 outputs a high level between the time that the beam detect signal next goes high and the next low to high transition of the A1 clock signal. At such time, the Q output from flip-flop 26 transitions to the high state and causes the output from And gate 30 to fall. As will hereafter be understood, this enable output only occurs once per beam detect signal and enables operation of the phase select circuitry once per beam detect signal.

The high output transition from AND gate 30 is delayed in delay 32 to guarantee that it occurs after the signal transition of the A1 clock—to prevent a metastable situation from occurring.

Figure 4B:
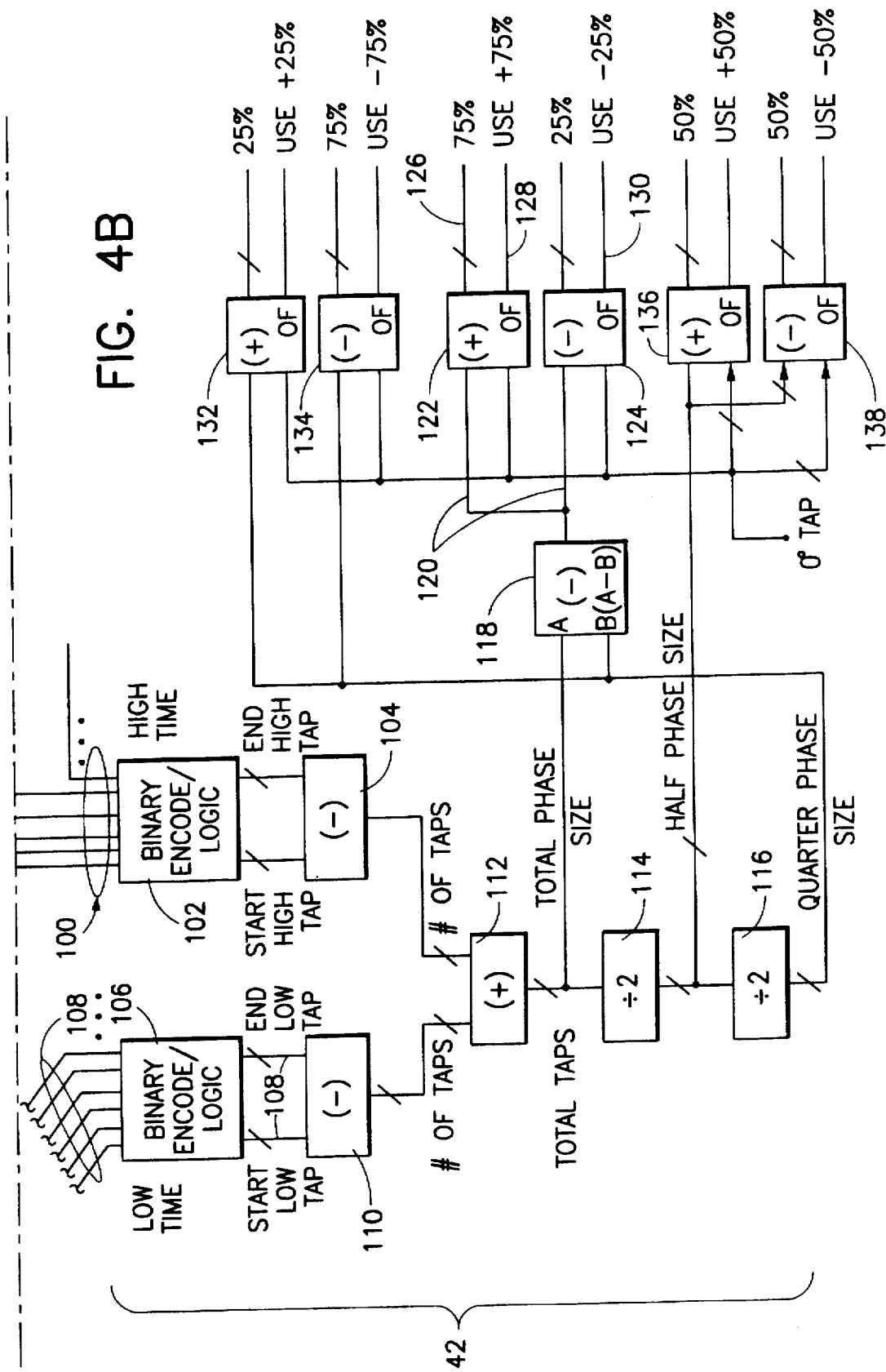
FIG. 4 illustrates a block diagram of a clock period measurement chain and phase control logic for generating control signals that enable the gating of desired phase, clock signals.

Turning to FIG. 4, the enable output on enable line 34 (from delay 32) is input to a plurality of flip-flops in a clock period measurement chain 40 and enables a "snapshot" of a full clock cycle to be obtained, immediately after the beam detect signal transitions to the high state. Thereafter, the enable signal falls and only when the next beam detect signal transition occurs is another snapshot taken.

Clock period measurement chain 40 comprises two substantially identical measurement chains (only one of which is shown) which, collectively, take a snapshot of the high and low times of the delayed clock signal appearing at taps A0–An. This data is then fed to phase-delay calculation logic 42 that computes which taps produce a desired phase shift clock signal.

Phase delay calculation logic 42 has a number of arithmetic units which use the 0° phase clock tap number and the high and low times of the reference clock to produce both a positive and a negative tap count. Tap positions for each of the desired phase clocks are then generated which are, in turn, fed to phase gate logic 44 (see FIG. 5) to enable gating of delayed clock signals appearing at terminals A1–An which are closest to the desired percent phase difference values.

In FIG. 4, clock period measurement chain 40 takes a snapshot of the high time of the clock signal whereas an identical (not shown) clock period measurement chain takes a snapshot of the low time. Once clock period measurement chain 40 achieves its "snapshot", the output levels from the respective flip-flops are fed to phase delay calculation logic 42 wherein the tap evidencing a low to high transition is found, using a carry propagation scheme similar to that used to find the 0° phase clock in FIG. 1. Similarly, a tap evidencing a high to low transition is also found. The tap number, where the low to high transition occurs, is subtracted from the tap number where a high to low transition is detected to obtain the total number of taps outputting high levels (and indicative of the duration of the high half of the clock cycle). Similarly, the tap number, where a high to low transition occurs, is subtracted from the tap number where a low to high transition is detected to obtain the total number of taps outputting low levels (and indicative of the duration of the low half of the clock cycle). The total low and high numbers of taps are then added to obtain the number of taps encompassing a complete clock cycle.

Then, the resulting sum of taps is divided by 2 and 4 to obtain phase tap counts spanning a half clock cycle and a quarter clock cycle. At this point, any divisor can be used to achieve a fractional phase value, depending upon which percent phase points are desired. The resulting phase tap numbers are those taps at which delayed clock signals exist which manifest a phase relationship closest in time to the desired percent phase value.

To obtain the final tap values, the fractional phase tap values are added or subtracted from the 0° tap number to obtain which taps should be gated by the phase gate logic of FIG. 4.

Figure 6:
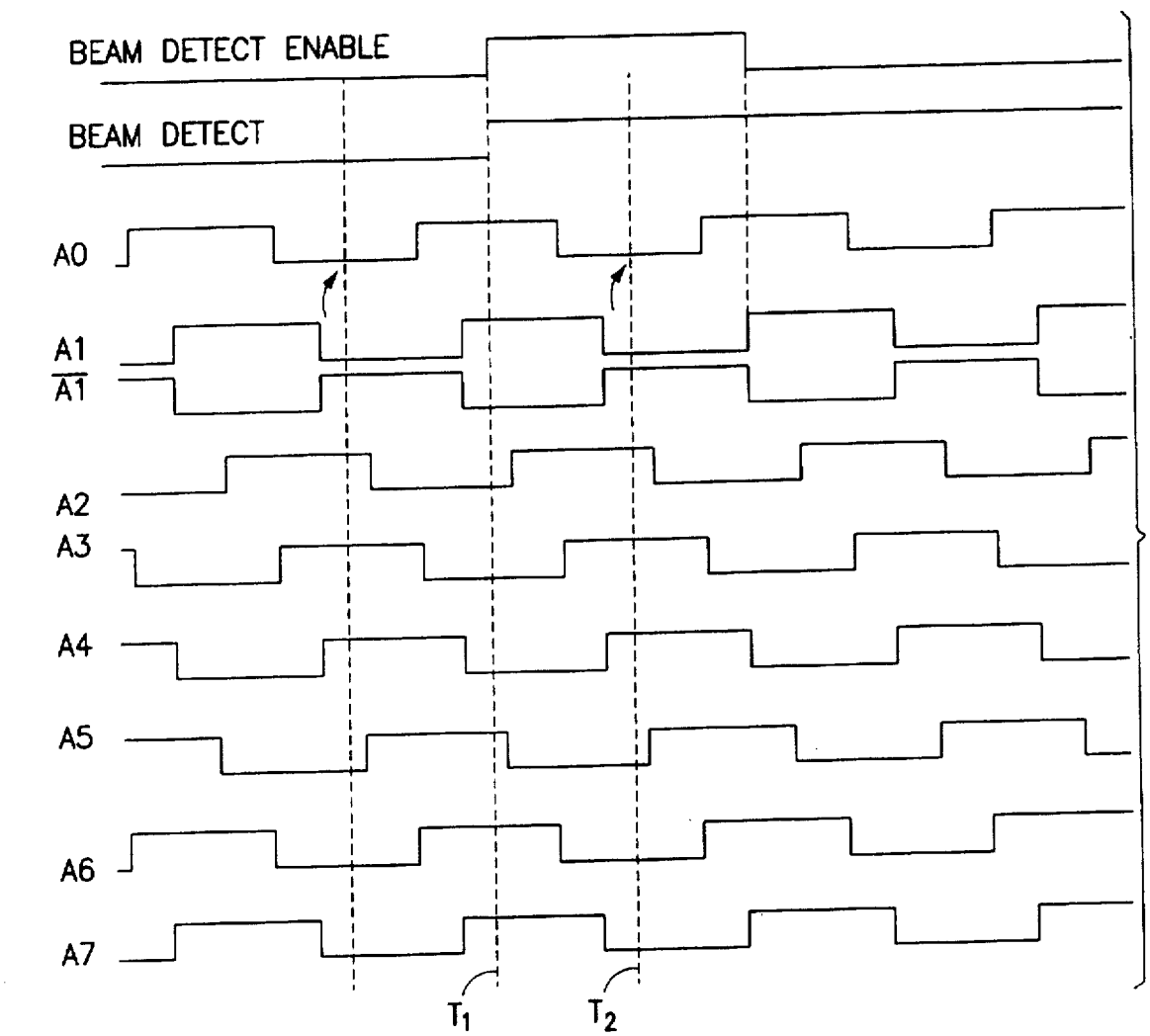
FIG. 6 is a waveform diagram helpful in understanding the operation of the circuits shown in FIGS. 1, 2, 4 and 5.

Returning to FIG. 1, a specific example will now be described (whose waveforms are illustrated in FIG. 6). As can be seen from FIG. 6, the beam detect signal goes high at time T1. At such time, the clock levels at taps A0 and A1 are high; taps A2, A3 and A4 are low; and taps A5, A6 and A7 are high. Further at T1, the beam detect transition clocks the flip-flops of snapshot register 12 FIG. 1), causing the setting of flip-flops 45–49 to 1, 0, 0, 0 and 1 states on their respective Q output lines.

Assuming that there is no metastable state present, phase detect logic 16 also outputs the level manifest by the Q line from flip-flop 45 (a high output). Thus, a high level appears on line 50 from phase detect logic 16 and is applied to select AND gate 51. In addition, the high level output from flip-flop 45 is inverted and applied to select AND gate 51. As a result, the output from AND gate 51 is low. However, the two high levels from flip-flop 45 and phase detect logic 16 cause carry AND gate 52 to output a high level to carry AND gate 56 and select AND gate 54, respectively. Select AND gate 54 responds by outputting a high level because the low output from flip-flop 46, as applied through inverter 58, then fully conditions select AND gate 54. By contrast, the output from carry AND gate 56 is set low by the low levels on both of its inputs. All further carry and select AND gates are similarly deconditioned by the low outputs of the respective carry AND gates. In such manner, all succeeding AND gate stages of search logic 14 are disabled.

The high level output from select AND gate 54 is applied to AND gate 66 in selector logic 20, thereby enabling the delayed clock signal appearing at terminal A2 to be clocked therethrough and out of OR gate 68, as the 0° phase clock. The high level at the output of select AND gate 54 is also fed to binary encode logic 22 which determines the binary value of the tap number at which the 0° phase clock has been found. That value is used when the percent phase taps are later calculated.

Further, the 0° phase clock output from OR gate 68 is fed to clock a beam detect resynchronizing flip-flop 69. The beam detect signal is also applied to flip-flop 69 whose output goes high upon the low to high transition of the 0° phase clock occurring immediately after the beam detect signal. The resulting output from AND gate 70 is a resynchronized beam detect pulse.

Pulse enable logic circuit 24 (see FIG. 2) is used to provide an enable pulse on enable line 26 only once per beam detect signal. The enable pulse enables clock period measurement chain 40 (FIG. 4) to capture a snapshot of an entire half cycle of the clock signal from taps A0–An just after occurrence of the beam detect signal and then not again until a next beam detect signal. That half cycle includes both a positive going transition and a negative going transition, and enables determination of delay chain tap numbers which evidence those respective transitions. From those tap numbers are calculated the taps of delay chain 10 which manifest desired percent phase outputs.

In FIG. 2, the beam detect signal is applied to flip-flop 26, as is the delayed clock signal from tap A1. (See the waveforms of FIG. 3). The output from flip-flop 26 is fed to an invert input of AND gate 30 as is the beam detect signal. The output of flip-flop 26 is initially low due to its being set by a previous clock input when the beam detect signal was low. The low input partially conditions AND gate 30, which becomes fully conditioned when the beam detect goes high. At such time, the output of AND gate goes high, is delayed briefly in delay circuit 32 and appears as an enable level on line 34. Upon the next low to high transition of the A1 clock, the output of flip-flop 26 goes high and deconditions AND gate 30. A next enable pulse does not occur until the next beam detect signal.

Turning to FIG. 4, the enable pulse on line 34 is applied to enable inputs of flip-flops 90, 92, 94 and 96, etc. Flip-flops 90, 92, 94, 96, etc. form a clock period measurement chain 30 which enables identification of the duration of time during which a half cycle of the clock signal is at its high state. As will become apparent below, a substantially similar circuit (not shown) provides identification of taps defining the limits of the negative half cycle of the clock signal. The operation of the positive and negative tap identification circuits are substantially similar except that clock period measurement chain 30 operates upon the positive going portion of the clock signal while the other clock period measurement chain operates upon the negative portion of the clock cycle.

The output from the A1 tap is inverted in buffer 97 and serves as a clock input to flip-flops 90, 92, 94, 96 . . . etc. Thus, on the first high to low transition of the A1 clock, after the enable pulse goes high, each of the aforesaid flip-flops is set to the level on its respectively connected delay chain tap. It is to be noted that the clocking inputs to each of flip-flops 90, 92, 94, 96, etc. is derived from the A1 (or later) tap to assure that the triggering action of each of the flip-flops occurs over a period encompassing a full half cycle of the clock signal.

As the a result of the above described action, flip-flops 90, 92, 94, 96, . . . apply levels to lines 100 which evidence the snapshot states at time T2 of each of their respectively connected delay chain taps (see FIG. 6). Binary encode logic 102 examines the state of each of lines 100 and determines a line which transitions from a low to a high state and a line which transitions from a high to a low state. Those respective lines are converted to binary values which, respectively evidence a tap number where the high clock state commences ("start high tap") and a tap number where the high clock state ends ("end high tap"). Those values are subtracted in a logical subtractor 104 which provides a binary output equal to the number of taps between the start high tap and the end high tap.

Similar inputs are applied to binary encode logic 106 from a low half cycle clock period measurement chain. Binary encode logic 106 provides outputs on input lines 108 that are indicative of the start and end of a low half cycle of the clock signal. As a result, binary encode logic 106 outputs a "start low tap" binary value and an "end low tap" binary tap value. Those values are subtracted in logical subtractor 110 to determine the number of taps which evidence the low state of the clock cycle.

The outputs of subtractors 104 and 110 are added by adder 112 to determine the total number of taps encompassing a complete clock cycle. The total tap value is then divided by 2 in divider 114 (half phase size) and again divided by 2 in divider 116 (quarter phase size).

At this point, phase delay calculation logic 42 employs the number of taps evidencing the total phase size, the half the phase size and the quarter phase size to determine the precise tap values which will provide clock phases evidencing relative 25%, 50% or 75% relationships to the previously derived 0° phase tap.

To accomplish these calculations, the total phase size tap sum is supplied to logical subtractor 118, as is the quarter phase tap sum. Logical subtractor 118 subtracts the two binary values and outputs a value on lines 120 equal to the number of taps spanning 75% of a full clock cycle. That value is applied to both logical adder 122 and logical subtractor 124. A further input thereto is the 0° phase tap number. Logical adder 122, adds the 0° tap number to the 75% clock phase tap sum to derive the tap number at which the 75% clock phase can be obtained.

If the 0° tap number is near the middle to the end of delay chain 10, the 75% tap number may be past the end of the delay chain. In such case, a 75% phase tap within the delay chain can be obtained by subtracting a quarter phase tap sum from the 0° tap number. That substraction occurs in logical subtractor 124, which outputs a tap number on which a clock signal can be found which has a −25% phase relationship to the 0° tap. The determination of which output to use (whether from logical adder 122 or logical subtractor 124) is determined from overflow outputs 128 and 130. For instance, if the number of taps added to the 0° tap to obtain a tap value wherein the 75% phase clock is present exceeds the number of taps in delay chain 10 overflow line 128 manifests a low state. Under such a condition, line 130 manifests a high state because subtraction of a number of taps from the 0° phase tap to obtain a 25% phase number falls within the boundaries of delay chain 10.

Similar calculations are carried on in logical adder 132 and logical subtractor 134 to determine whether a +25% tap value should be used or a −75% tap value (as related to the 0° phase tap). Similar calculations are also performed in logical adder 136 and logical subtractor 138 to determine whether to use a +50% or −50% tap value.

The respective outputs from phase delay calculation logic 32 are applied to phase gate logic shown in FIG. 5. Thus, the +25% tap number; the −75% tap number and the high or low enable levels on "use +25%" and "use −75%" lines are applied to a binary to output convert logic module 140. If the +25% binary value is indicated to be used (i.e.,high level), logic module 140 puts a high state on one of output lines 142 which is applied to the same AND gate as the clock signal emanating from a terminal A1—An and evidencing a +25% phase relationship to the 0° phase tap.

Assuming that the +25% phase emanates from tap A3, AND gate 144 is conditioned by an output line from logic module 140 and thus outputs to OR gate 146 the delayed clock signal appearing on tap A3. While only taps A1–A5 are shown in FIG. 5, it is to be understood that all of the taps of delay chain 10 are fed to respective AND gates so as to enable the gating therethrough of a particularly desired phase clock signal.

50% binary to output convert logic and 75% binary to output convert logic operate in an identical manner to the 25% logic module 140 aforedescribed. As a result, outputs from OR gates 146, 148 and 150 manifest clock signals having a 25%, 50% and 75% phase relationship to the tap on delay chain 10 which outputs the 0° phase signal. From a review of FIGS. 1–6, it can be seen that the above noted clock resynchronizing action occurs upon each transition of the beam detect signal, thereby assuring clock resynchronization after each beam detect signal. Further, the invention enables the precise selection of various phase clock signals having predetermined relationships with the beam detect signal.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for use in a laser printer, said apparatus including beam detect means for producing a beam detect signal each time a laser beam is repetitively scanned thereover, and clock means for generating a clock signal that is asynchronous to said beam detect signal, said laser printer comprising:

delay means connected to receive said clock signal and including a plurality of taps, each tap outputting a delayed phase clock signal;

0° phase means for selecting one of said taps whose delayed phase clock signal is closet in phase to a beam detect signal transition and for outputting a 0° tap number corresponding thereto;

enable means for outputting an enable signal once per beam detect signal;

register means coupled to said taps of said delay means and responsive to said enable signal, for registering a delayed phase clock signal state at each tap and providing outputs indicative thereof;

phase calculation logic responsive to said register means outputs and said 0° degree tap number, for determining, from among said taps, at least one tap at which a delayed phase clock signal is present which manifests a determined delayed phase relationship with respect to said 0° phase clock and for providing a selected tap signal indicative of said at least one tap; and gate means coupled to said taps and responsive to said selected tap signal for providing a delayed phase clock signal appearing at said selected tap, to an output.

2. The apparatus as recited in claim 1, wherein said phase calculation logic comprises:

sum means for providing a value of a total number of taps spanning both high and low portions of a clock signal;

arithmetic means responsive to said value for providing a fractional phase value indicative of a number of taps spanning a fraction of said clock signal; and logic means responsive to said fractional value and said 0° tap number for identifying a fractional tap number where a phase delayed clock signal is present that exhibits said fractional phase value with respect to said 0° phase clock signal.

3. The apparatus as recited in claim 2, wherein said logic means further determine if said fractional tap number is within a span of taps on said delay means, and if not, determines an alternate tap exhibiting said fractional phase value, said alternate tap comprising said selected tap signal.

4. The apparatus as recited in claim 3, wherein said enable means is controlled by said beam detect signal and a delayed phase clock signal to output said enable signal.

5. The apparatus as recited in claim 4, wherein said phase calculation logic independently determines a number of taps outputting a high level of said delayed clock signal and a number of taps outputting a low level of said delayed clock signal.

6. A method for generating variable phase clocks in a laser printer, said laser printer including beam detect means for producing a beam detect signal each time a laser beam is repetitively scanned thereover, and clock means for generating a clock signal that is asynchronous to said beam detect signal, said method comprising the steps of:

applying said clock signal to a delay means including a plurality of taps, each tap outputting a delayed phase clock signal;

selecting a 0° phase tap whose delayed phase clock signal is closest in phase to a beam detect signal transition and outputting a 0° tap number corresponding thereto;

outputting an enable signal once per beam detect signal;

registering a delayed phase clock signal state at each tap in response to said enable signal, and providing outputs indicative thereof;

determining, from among said taps, at least one tap at which a delayed phase clock signal is present which manifests a determined delayed phase relationship with respect to said 0° phase clock and for providing a selected tap signal indicative of said at least one tap; and operating a gate circuit which is coupled to said taps, in response to said selected tap signal, to pass a delayed phase clock signal appearing at said selected tap, to an output.

7. The method as recited in claim 6, wherein said determining step performs the substeps of:

providing a value of a total number of taps spanning both high and low portions of a clock signal;

providing a fractional phase value indicative of a number of taps spanning a fraction of said clock signal; and in response to said fractional value and said 0° tap number, identifying a fractional tap number where a phase delayed clock signal is present that exhibits said fractional phase value with respect to said 0° phase clock signal.

8. The method as recited in claim 7, wherein said determining step performs the further substep of:

finding if said fractional tap number is within a span of taps on said delay means, and if not, finding an alternate tap exhibiting said fractional phase value, said alternate tap comprising said selected tap signal.

* * * * *